(No Model.)
J. VOLK.
HAND CABLE LIFTER.
No. 423,293. Patented Mar. 11, 1890.
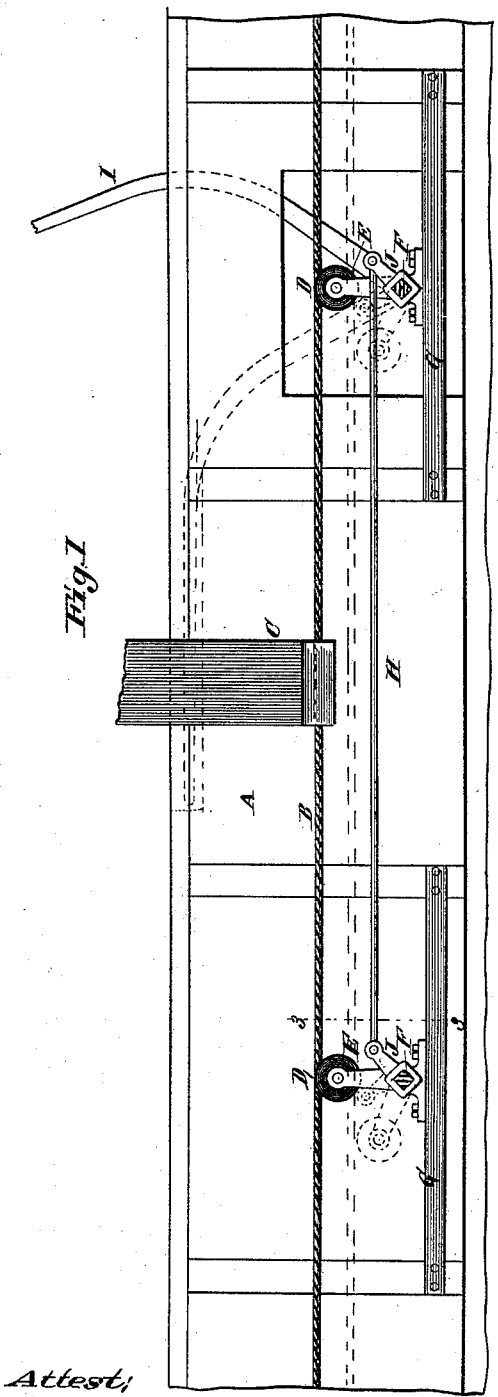
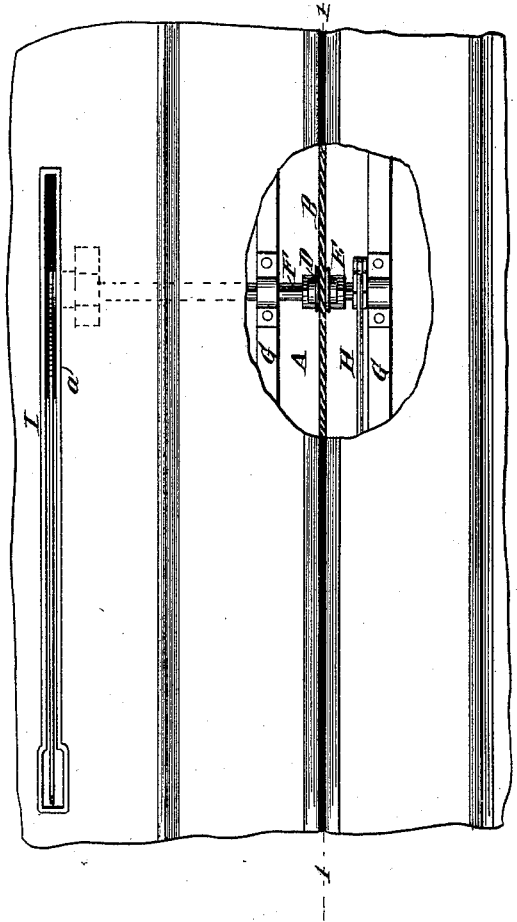
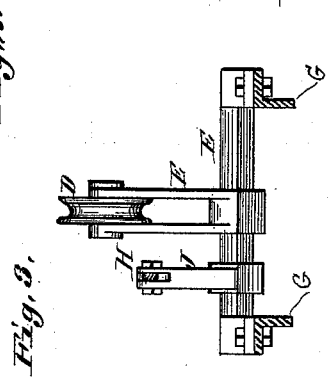
Attest:
K. Morgner
E. B. Morgner
Inventor:
Jacob Volk

UNITED STATES PATENT OFFICE.

JACOB VOLK, OF ST. LOUIS, MISSOURI, ASSIGNOR TO THE VOLK CABLE CROSSING GRIP AND CAR BRAKE COMPANY, OF CHICAGO, ILLINOIS.

HAND CABLE-LIFTER.

SPECIFICATION forming part of Letters Patent No. 423,293, dated March 11, 1890.

Application filed July 19, 1889. Serial No. 318,038. (No model.)

*To all whom it may concern:*

Be it known that I, JACOB VOLK, a citizen of the United States, residing at St. Louis, in the State of Missouri, have invented certain new and useful Improvements in Hand Cable-Lifters; and I do hereby declare the following to be a full, clear, and exact description of the invention, such as will enable others skilled in the art to which it appertains to make and use the same.

The object of this invention is to provide convenient and satisfactory means for lifting by hand the cable of a cable railway at the beginning and end of the railway at points where another cable is crossed, and generally whenever it is necessary to drop the cable temporarily and lift it again. This object I attain by mounting the supporting-pulleys of the cable on arms attached to rock-shafts and rocking the latter to raise or lower the cable, as desired.

In the accompanying drawings, Figure 1 represents a side elevation of my lifting devices, cable, and gripper within a conduit, the position of the parts when inactive being indicated by dotted lines. Fig. 2 represents a plan view of a portion of the conduit, partly broken away to show contents. Fig. 3 represents a detail elevation of one of the shafts and its attachments, the bars on which it is mounted being in section.

A designates the conduit; B, the cable; C, the grippers; D, the pulleys over which the cable runs; E, arms on which said pulleys are mounted; F, rock-shafts from which said arms extend; G, supporting-bars attached to the conduit and affording bearings for said shafts; H, long connecting-rods extending from shaft to shaft and attached to arms J on shaft F, and I a handle-lever extending up through a longitudinal slot $a$ at one side of the conduit and jointed at its lower end to one of said shafts. When this lever is moved in one direction, the shafts are rocked so as to lift the cable into position for the grippers, as shown in full lines in Fig. 1. When it is moved in the other direction, the shafts are rocked, so as to lower the cable-pulleys and arms into the position indicated by dotted lines in Fig. 1. In the latter case the cable is out of grip and does not actuate the cars.

Having thus described my invention, what I claim as new, and desire to secure by Letters Patent, is—

A conduit and bars attached to the interior thereof, in combination with shafts mounted on said bars, a connection between said shafts, a lever for rocking said shafts, arms extending from said shafts, pulleys on said arms, and a cable resting on said pulleys and raised or lowered by the motion of said lever and shafts, substantially as set forth.

In testimony whereof I affix my signature in presence of two witnesses.

JACOB VOLK.

Witnesses:
 ALBERT GERST,
 KOSSUTH MORGNER.